United States Patent
Weedon et al.

(10) Patent No.: US 7,543,304 B2
(45) Date of Patent: Jun. 2, 2009

(54) METHOD FOR EFFICIENT LOCATION OF CORBA OBJECTS BASED ON AN UNMARSHALED OBJECT KEY IN A REQUEST

(75) Inventors: Jonathan K. Weedon, Nevada City, CA (US); Vishwanath Kasaravalli, Hayward, CA (US)

(73) Assignee: Borland Software Corporation, Austin, TX (US)

( * ) Notice: Subject to any disclaimer, the term of this patent is extended or adjusted under 35 U.S.C. 154(b) by 446 days.

(21) Appl. No.: 10/013,339

(22) Filed: Dec. 10, 2001

(65) Prior Publication Data

US 2002/0091750 A1 Jul. 11, 2002

Related U.S. Application Data

(60) Provisional application No. 60/225,551, filed on Dec. 14, 2000.

(51) Int. Cl.
*G06F 9/44* (2006.01)
(52) U.S. Cl. .................. 719/316; 709/203; 719/330
(58) Field of Classification Search ......... 719/315–316, 719/330–332; 709/203, 226, 217, 219; 710/310, 710/315, 316, 330; 707/204, 103 R, 9, 10; 718/101
See application file for complete search history.

(56) References Cited

U.S. PATENT DOCUMENTS

| | | | | | |
|---|---|---|---|---|---|
| 5,577,251 | A | * | 11/1996 | Hamilton et al. | 718/101 |
| 5,615,362 | A | * | 3/1997 | Jensen et al. | 707/103 R |
| 5,737,605 | A | * | 4/1998 | Cunningham et al. | 719/312 |
| 5,737,607 | A | * | 4/1998 | Hamilton et al. | 719/316 |
| 5,787,251 | A | * | 7/1998 | Hamilton et al. | 709/203 |
| 5,991,823 | A | * | 11/1999 | Cavanaugh et al. | 719/330 |
| 6,003,083 | A | * | 12/1999 | Davies et al. | 709/226 |
| 6,032,199 | A | * | 2/2000 | Lim et al. | 719/316 |
| 6,044,409 | A | * | 3/2000 | Lim et al. | 719/315 |
| 6,052,528 | A | * | 4/2000 | Dechamboux | 717/116 |
| 6,189,048 | B1 | * | 2/2001 | Lim et al. | 719/330 |
| 6,223,344 | B1 | * | 4/2001 | Gerard et al. | 717/170 |
| 6,249,803 | B1 | * | 6/2001 | Jindal et al. | 709/203 |
| 6,272,557 | B1 | * | 8/2001 | Lim et al. | 719/315 |
| 6,405,264 | B1 | * | 6/2002 | Jindal et al. | 719/316 |
| 6,438,616 | B1 | * | 8/2002 | Callsen et al. | 719/316 |
| 6,453,320 | B1 | * | 9/2002 | Kukura et al. | 707/103 R |
| 6,513,112 | B1 | * | 1/2003 | Craig et al. | 713/1 |
| 6,516,354 | B2 | * | 2/2003 | Cavanaugh | 719/316 |

(Continued)

OTHER PUBLICATIONS

Gokhale et al. "Design considerations and performance optimizations for real-time ORBs" May 1999, pp. 1-14.*

*Primary Examiner*—Van H Nguyen
(74) *Attorney, Agent, or Firm*—Kokka & Backus, PC

(57) ABSTRACT

Disclosed are methods and threads for responding to a request to perform an operation on a server object as may be provided in software form within an object request broker (ORB) server library or an ORB server. The specified object is identified by a marshaled object key in a conventional manner. The method improves upon prior art techniques by directly locating the object using the marshaled object key free of any unmarshaling step. The specified operation can then be invoked on the located object. The method applies to both in-process and out-of-process requests. In a preferred implementation, the marshaled object key is utilized as a hash key to directly access a pointer to the object.

8 Claims, 2 Drawing Sheets

U.S. PATENT DOCUMENTS 6,718,550 B1 * 4/2004 Lim et al. .................. 710/310
6,766,335 B2 * 7/2004 Kukura et al. ............... 707/204
6,907,609 B1 * 6/2005 Kukura et al. ............... 719/316
6,981,255 B2 * 12/2005 Kanamori ................... 718/100

* cited by examiner

US 7,543,304 B2

METHOD FOR EFFICIENT LOCATION OF CORBA OBJECTS BASED ON AN UNMARSHALED OBJECT KEY IN A REQUEST

This patent application claims the benefit of priority under 35 U.S.C. §119 of U.S. Provisional Application Ser. No. 60/255,551, filed Dec. 14, 2000, entitled "Method For Dispatching Objects," the entirety of which is being hereby incorporated by reference.

FIELD OF THE INVENTION

The present invention relates to handling of common object requests, and more particularly, to methods and software for fast handling of such requests.

BACKGROUND OF THE INVENTION

There is a need to locate and dispatch server objects as fast as possible in response to requests. Requests can originate in-process from a client subsystem of an object request broker ("ORB") or out-of-process, from a client which is separate from the server. A typical request contains the request ID server address (e.g., an Internet protocol address), an operation to be invoked (e.g., a software method), and an object key which is used to identify a specific object. The object key is marshaled into a byte array for transfer along with the rest of the request, for example, to a network socket at the ORB server. Multiple requests (or "threads") are ordinarily pending at any one time for handling by an ORB server.

Once the request is at the server, the byte array is unmarshaled back into a textual form (e.g., "U.S.A./California/San Mateo.123"). A hierarchy of portable object adapters ("POA") located within the ORB server are ascribed textual names and are accessed by traversing the hierarchy using the information in the object key. Thus, as shown in FIG. 1 for Bank X, a hierarchy of POAs are contained within their server, in which the POA, "U.S.A." is accessed followed by the POA "San Mateo" (again, as opposed to some other locality within the parent state "California") until the specified object "123" is located. Thus, traversal of the POAs starts at a root and continues down the tree defined by the object key. The server can only now invoke the requested method on the specified object. Object "123" can be one bank account, whereas objects "456" and "789" can be different accounts. The method to be performed can, by way of illustration, be account balance inquiries, deposits, withdrawals, transfers, and the like, or other methods appropriate to the type of objects in a given ORB server.

Once the method has been invoked on the specified object, the server initiates a reply method which places the value, if any, resulting from the method along with the IP address of the client (if appropriate), and a request ID that permits the reply to be matched to the request.

The unmarshaling and the POA traversal consume time which results in a lower system performance. For a transaction oriented application built upon an ORB, the number of transactions per second is greatly limited by this traversal to the identified object.

What is needed in the art is a methodology for improving ORB performance. What is further needed is software constructs to implement such a method. The present invention satisfies these and other needs.

SUMMARY OF THE INVENTION

The present invention provides methods for responding to a request to perform an operation on a server object as may be provided in software form within an object request broker (ORB) server library or an ORB server. The specified object is identified by a marshaled object key in a conventional manner. The method improves upon prior art techniques by locating the object using the marshaled object key free of any unmarshaling step. The specified operation can then be invoked on the located object. The method applies to both in-process and out-of-process requests. In a preferred implementation, the marshaled object key is utilized as a hash key to directly access a pointer to the object.

In another aspect of the invention, a thread for an ORB server architecture is configured to respond to a request from either a client or a client sub-system, match a marshaled object key in the request against entries in a table, respond to any match with the location of the specified server object, and invoke the requested operation on the located server object.

The invention can be better appreciated with reference to the following description of certain preferred embodiments thereof and the accompanying drawing figures.

BRIEF DESCRIPTION OF THE DRAWING FIGURES

DETAILED DESCRIPTION OF CERTAIN PREFERRED EMBODIMENTS

By way of overview and introduction, the present invention provides improved object request brokering by circumventing the unmarshaling step of conventional ORB servers and instead applying the marshaled object key (a byte array) directly to a global table and, if the byte array is in the table, referencing the server object directly without searching the POA tree. Consequently, the present invention provides performance improvements over conventional ORB servers when handling out-of-process requests. In accordance with a further aspect of the invention, in-process requests can be packed with an activation record containing a pointer to the object so that the server subsystem can invoke the requested method directly without examining the global table or searching the POA tree.

Figure 1:
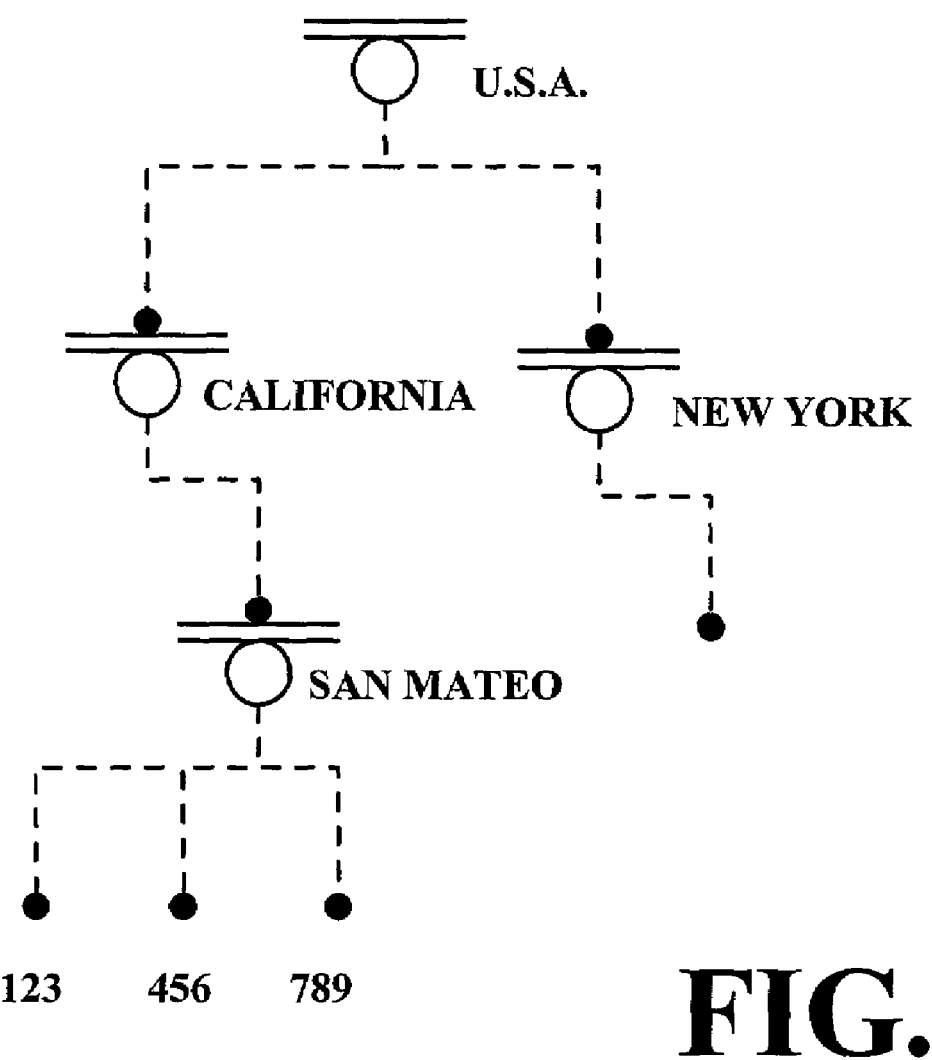
FIG. 1 illustrates a portable object adapter hierarchy of conventional design, in which several objects are represented.
Figure 2:
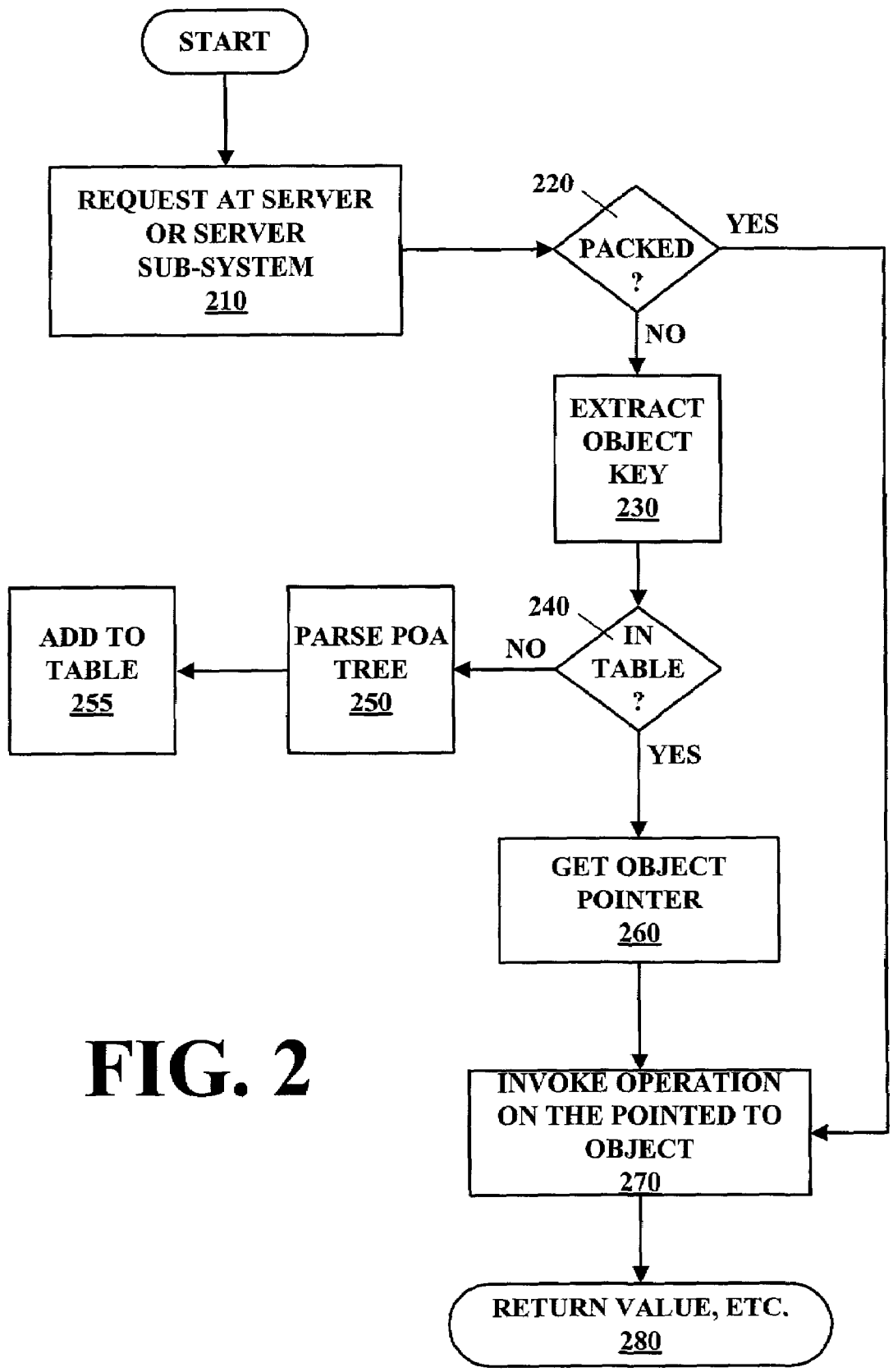
FIG. 2 illustrates process flow which facilitates a discussion of certain preferred embodiments of the optimization method of the present invention.

With reference now to FIG. 2, a process flow is described which permits a server object to be located and a requested operation to be invoked free of any need to parse the POA tree of FIG. 1. The process starts at step 210 at which a request is received at the server or at a server subsystem. The request can be received in any conventional manner. For example, in a distributed system, the client is remote from the ORB server and the request is received at a network socket and detected by a thread running at the ORB server. On the other hand, the request can originate within a process that includes the server and client (i.e., co-located), a so-called in-process request.

At step 220, a test is made to determine whether the request is packed with an activation record. The activation record is preferably a structure which is configured to hold a variety of information about server objects, including information sufficient to identify the location of a server object. In a preferred implementation, the activation record is constructed as shown in the following pseudocode:

activationrecord ([object pointer] [parent POA pointer] [object name] . . . )

More particularly, the "object pointer" points to a specific server object and the "parent POA pointer" is the parent POA of the object. With reference again to FIG. 1, the object pointer can point, for example, to object "123" while the "parent POA pointer" points to "San Mateo" . The activation record can include a number of other fields which have particular utility in specific applications, though additional fields are not required. One other field, for example, can be the object's name (e.g., "123").

A request need not include the activation record in order to enjoy optimized request processing in accordance with the present invention. Additional performance benefits result, however, when an in-process request is packed to include the activation record, as described in detail below.

If the test at step 220 determines that the request was packed (with the activation record), then the process flow advances to step 270 so as to invoke the operation on the located object. On the other hand, if the request lacks the information in the activation record, then the marshaled object key included in the request is extracted, as indicated at step 230 so that the object specified in the request can be identified.

In accordance with a salient aspect of the present invention, the extracted object key is used to try and directly locate the specified object without resort to the POA tree. At step 240, the marshaled object key is applied as a hash key to a table which includes the activation record described above. The table is preferably a global table available to a multiplicity of threads and operations at the ORB server. The table includes at least two columnar fields: a hash key column consisting of the marshaled object keys that, when unmarshaled, provide a textual key to parsing the POA hierarchy, and an activation record column consisting of activation records corresponding to the marshaled object keys.

If the marshaled object key extracted from the request is located in the table, then an object pointer which points to the object is retrieved at step 260 thereby locating the object in the server. An operation can then be invoked on the object being pointed to. Thus, a request identifying a particular bank account (the object) and asking for a balance (the operation) can be handled free of any traversal of the POA tree if the marshaled object key is in the table.

If the marshaled object key cannot be found in the table, then the POA tree is parsed in a conventional manner, as indicated at step 250. Optionally, once the object has been located the table can be updated to include the unmarshaled object key as a hash key and the relevant data to populate a new entry in the activation record, as indicated at step 255.

Thus, if the object has been "awakened" once through a conventional POA tree parse, it can be later located directly by looking up the global table.

With respect to a co-located process, in which the request originates at a client-side subsystem of the process, the request can be handled in the same manner as an out-of-process request. However, in accordance with a second preferred embodiment of the invention, the in-process request can be configured to include the activation record of the object on which the invocation is made.

The invention can be implemented as a process or thread running in an ORB server. The thread is configured to perform the operations outlined above, and more particularly, to respond to a request from either a client or a client subsystem, match a marshaled object key in the request against entries in a table, and respond to any match with a located server object so that the requested operation can be invoked on the located server object.

It should be understood that there is never a need to unmarshal the object key, and, accordingly, there is a great performance advantage as compared to prior techniques which are burdened by the overhead of translating the byte array in the request into a textual object key, that is, into the native form required by the ORB server to traverse the POAs.

The invention has utility in transaction oriented application such as an App Server 4.0 and later releases Visibroker 4.0 and Appcenter 4.0 and their respective later releases all products of Borland Software Corporation, Los Gatos, Calif. Also, telecommunications software such as Sabre and its progeny can operate over a distributed network at a greater rate through rapid location of server objects.

While the present invention has been described with respect to a particularly preferred embodiment, the invention is susceptible to implementation in other ways which are within the spirit of the invention which is defined in terms of the recitations of the appended claims and equivalents thereof.

We claim:

1. In an object request broker library of an object request broker server residing on a computer, a method for optimally responding to an out-of-process request by a remote client to perform an operation on a particular object selected from a plurality of objects each having an associated object key, the particular object residing on a computer-readable medium and being capable of being identified by an associated marshaled object key, wherein the associated marshaled object key includes a byte array computed by transforming the associated object key, comprising the steps of:

a) locating the particular object specified by the out-of-process request by an object request broker utilizing the associated marshaled object key free of any computation that would reverse the transformation of the associated object key and a mapping of a plurality of marshaled object keys to associated ones of the plurality of objects, the mapping generated by unmarshaling one or more of the plurality of marshaled object keys, locating the associated objects identified by the one or more unmarshaled object keys, and creating an association in the mapping between the one or more marshaled object keys and the associated located objects; and b) invoking the requested operation on the located particular object by the object request broker.

2. The method as in claim 1, wherein the mapping includes a hash table and the locating step includes the step of applying the associated marshaled object key as a hash key to the hash table so as to directly locate the particular object.

3. The method as in claim 1, wherein the method is performed by a server side library.

4. The method of claim 1 wherein the request to perform an operation on an object is initiated by a process, and the object resides external to the process which initiated the request to perform an operation.

5. The method of claim 4, wherein the object and the process which initiated the request to perform the operation reside on different computers.

6. An object request broker server residing on a computer having a computer readable medium, running a thread that executes instructions encoded in the computer readable medium, and being of the type which handles out-of-process requests to perform operations on server objects, each having an object key, the thread executed instructions comprising the steps of a) responding to an out-of-process operation request from one of a client computer and a client computer sub-system;

b) matching a particular marshaled object key in the request against entries in a table associating marshaled object keys with server objects, each marshaled object key including a byte array computed by transforming the respective object key, and the table being generated by mapping a plurality of marshaled object keys to associated ones of the server objects, the mapping generated by unmarshaling one or more of the plurality of marshaled object keys, locating the associated server objects identified by the one or more unmarshaled object keys, and creating an association in the mapping between the one or more marshaled object keys and the associated located server objects; and c) responding to any match by locating a particular server object associated with the particular marshaled object key, and invoking the requested operation on the particular located server object.

7. The thread as in claim 6, wherein the particular server object is located free of any traversal of a portable object adapter hierarchy at the object request broker server.

8. A computer-implemented system for an object request broker server of the type which handles requests to perform operations on server objects, each having an object key, comprising:

a computer having a processor; and a computer-readable medium encoded with a computer program, the computer program being configured to:

a) receive a first request from one of a first client and a first client sub-system, the first request including a requested operation and a marshaled object key wherein at least a part of the marshaled object key includes a byte array computed by transforming the object key;

b) unmarshal the marshaled object key from the first request to compute an unmarshaled object key;

c) create an entry in a table using the unmarshaled object key to associate the marshaled object key with a server object;

d) receive a second request from one of a second client computer and a second client sub-system computer, the second request including the marshaled object key;

e) match the marshaled object key in the second request with the corresponding entry in the table;

f) locate the server object; and g) invoke the requested operation on the located server object.

\* \* \* \* \*